United States Patent
Su

(10) Patent No.: US 6,763,609 B2
(45) Date of Patent: Jul. 20, 2004

(54) INJECTION MOLDED AND WELTED FOOTWEAR AND CONSTRUCTION METHOD THEREOF

(75) Inventor: Robert H. Su, Los Gatos, CA (US)

(73) Assignee: United Shoe Trading Ltd., Kowloon (HK)

( * ) Notice: Subject to any disclaimer, the term of this patent is extended or adjusted under 35 U.S.C. 154(b) by 32 days.

(21) Appl. No.: 10/057,378

(22) Filed: Jan. 24, 2002

(65) Prior Publication Data

US 2003/0136024 A1 Jul. 24, 2003

(51) Int. Cl.[7] ............................................. A43B 13/28
(52) U.S. Cl. ............................. 36/12; 36/14; 36/17 R
(58) Field of Search ........................... 36/12, 14, 25 R, 36/17 R, 17 A, 17 PW

(56) References Cited

U.S. PATENT DOCUMENTS

| | | | | |
|---|---|---|---|---|
| 3,070,909 A | * | 1/1963 | Binder | 36/14 |
| 3,216,033 A | * | 11/1965 | Nadler | 12/142 R |
| 4,120,104 A | * | 10/1978 | Lasmo | 36/117.2 |
| 5,628,127 A | * | 5/1997 | Notzold | 36/14 |
| 5,727,271 A | * | 3/1998 | Romanato et al. | 12/142 RS |
| 5,732,480 A | * | 3/1998 | Notzold | 36/14 |
| 5,930,917 A | * | 8/1999 | Pavelescu et al. | 36/12 |

* cited by examiner

Primary Examiner—M. D. Patterson
(74) Attorney, Agent, or Firm—Intellectual Property Law Group LLP; Otto O. Lee; Juneko Jackson

(57) ABSTRACT

Injection molded welted construction footwear according to the present invention includes a perforated midsole welted to an upper. The perforated midsole permits molten outer sole material to flow through the midsole during the molding process and fill the space between the insole and the midsole and thus sandwich the midsole. This technique forms outer soles to be durably and flexibly attached to the upper without use of traditional adhesives.

10 Claims, 11 Drawing Sheets

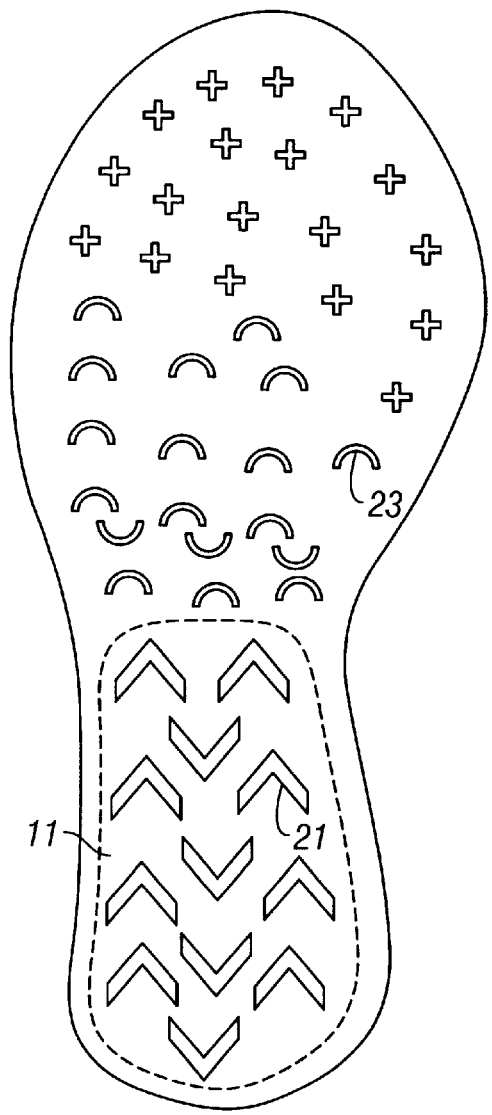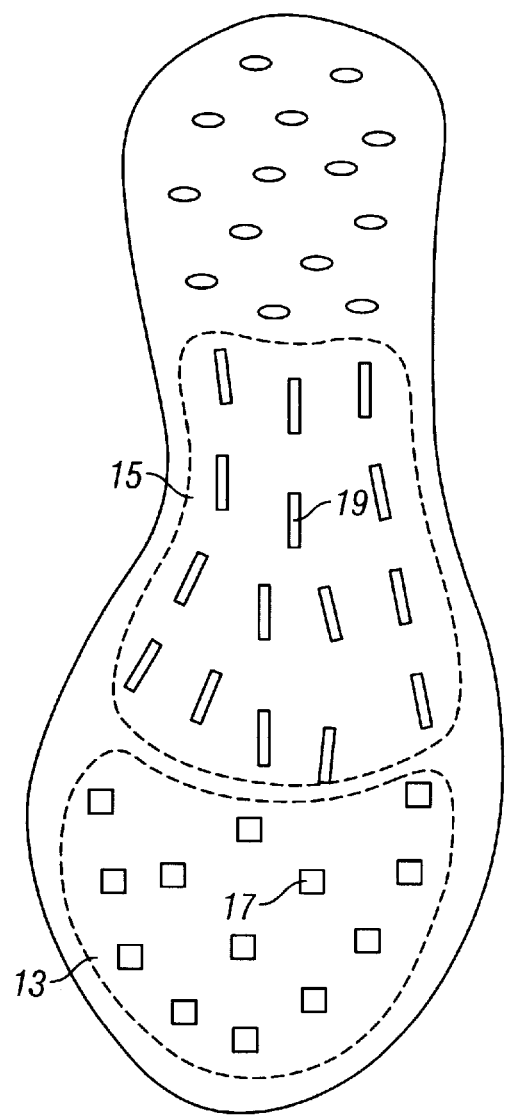
FIG. 21  FIG. 22

INJECTION MOLDED AND WELTED FOOTWEAR AND CONSTRUCTION METHOD THEREOF

BACKGROUND OF THE INVENTION

1. Field of the Invention

This invention relates to footwear sole construction, and more specifically to sole injection molding for welted construction footwear.

2. Description of the Prior Art

Conventional footwear construction has generally followed two methods, welted construction and molded construction. Welted construction generally stitches an outer sole to an upper to form footwear and thus is labor intensive and therefore expensive. Molded construction generally uses molds and liquid sole material to form the sole onto an upper. This is a less expensive alternative that results in a very durable and flexible outer sole, however the bond between the outer sole and the upper may not be as durable as welted attachment.

Both methods may also attach a midsole to an upper and attach an outer sole thereto using an adhesive. This may be a less expensive alternative, it also produces less satisfactory results.

What is needed is a method that combines the efficiency and durability of molding methods with the quality results of welted construction.

SUMMARY

In a first aspect, the present invention provides a perforated midsole for welting to an upper. The midsole may be made of soft woven or other soft to semi-rigid midsole board material. The perforations enable molten outer sole material to flow above the midsole and thus solidly bind a molded outer sole to an upper without the use of conventional adhesives. This technique results in a flexible footwear with a durable outer sole.

In another aspect, the present invention provides a method of mold forming soles onto welted uppers without the use of conventional adhesives.

In a still further aspect, the present invention provides a die-cut midsole having alternative perforation styles and patterns for a midsole according to the present invention. The different patterns are suitable for different outer sole materials and may also result in different wear characteristics.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

FIG. 21 is a top view of an alternative embodiment of a midsole according to the present invention.

FIG. 22 is a top view of another alternative embodiment of a midsole according to the present invention.

DETAILED DESCRIPTION OF EMBODIMENTS OF THE INVENTION

Figure 1:
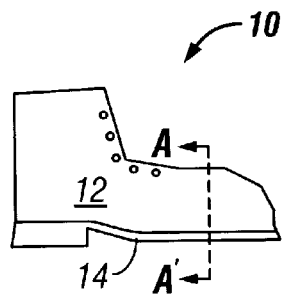
FIG. 1 is a side view of a shoe according to the present invention.

Referring to FIG. 1, a side view of a shoe 10 according to the present invention is shown. The externally visible elements of shoe 10 are upper 12 and outer sole 14. Upper 12 may be formed from any conventional material such as leather, fabric or synthetic material and may be formed by any conventional method such as lasting. Outer sole 14 may be formed by any conventional molding method using any suitable material. In a currently preferred embodiment of the present invention, outer sole 14 is formed using molten polyurethane.

Figure 2:
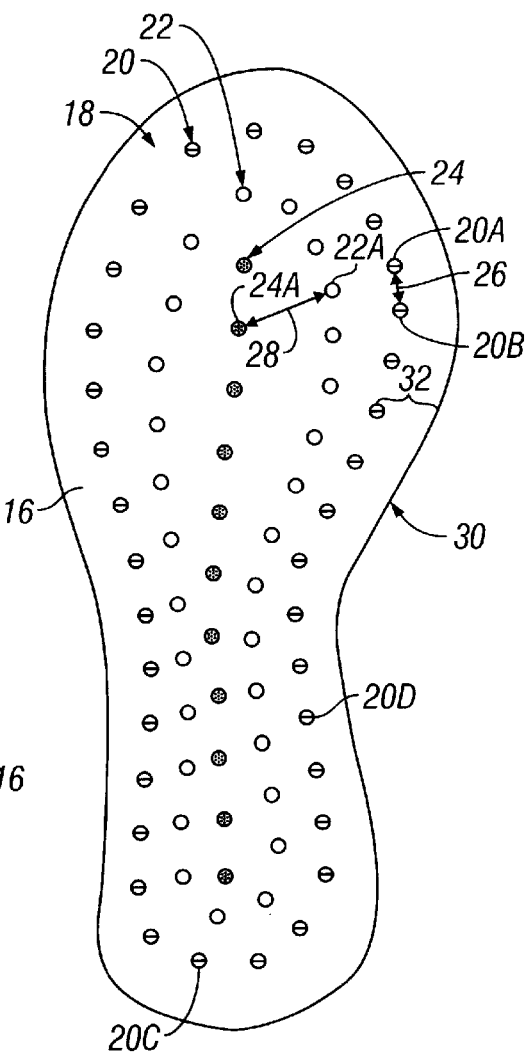
FIG. 2 is a top view of a midsole according to the present invention.

Referring now to FIG. 2, midsole 16 may be welted to upper 12. Midsole 16 may be composed of any conventional midsole material such as soft woven or other soft to semi rigid midsole board material. Midsole 16 may include perforations 18. Perforations 18 may be separated into groups such as perforations 20, 22 and 24. Perforations such as perforations 18 may be formed by any conventional means during or after the formation of a midsole such as midsole 16. In a currently preferred embodiment of the present invention, all perforations 18 are circular and are formed by die cutting. In alternative embodiments, edge perforations such as perforations 20 may have different sizes and or shapes than mid perforations such as perforations 22, or center perforations such as perforations 24. Perforations such as perforations 18 may be grouped and treated in many different configurations such as heel group 11 and or toe group 13 or arch group 15 as shown in FIGS. 21 and 22. The perforations such as perforations 18 may be formed in many different sizes and shapes such as squares 17, rectangles 19, chevrons 21, arcs 23 or any other conventional shape or combination of shapes also as shown in FIGS. 21 and 22.

Referring again to FIG. 2, inter-perforation spacing 26 may vary between perforations such as perforation 20A and perforation 20B, and between perforations such as perforation 22A and perforation 24A. Edge perforations such as perforations 20 may be set back away from edge 30 by a space 32. Space 32 may be the same around the perimeter of midsole 16 as shown or may vary with the location of a perforation around the midsole such that a perforation such as perforation 20C may be closer or farther from edge 30 than a perforation such as perforation 20D.

Figure 3:
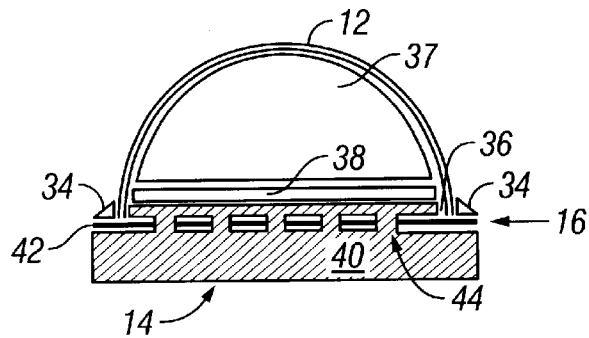
FIG. 3 is a cross section view of the shoe of FIG. 1 taken along A–A'.

Referring now to FIG. 3, the shoe 10 is shown in a cross section view taken along A–A'. Midsole 16 is shown attached to upper 12 using welting strip 34. Outer sole 14 is shown sandwiching midsole 16. The material used to form outer sole 14 such as material 40 is permitted to flow through perforations such as perforation 44 and fill space 36 between midsole 16 and insole 38. A form such as last 37 or other suitable shape may be used in upper 12 to maintain an even distribution of material 40. Once material 40 has cured or hardened, midsole 16 is inextricably bound within material 40 of outer sole 14, and thus outer sole 14 is attached to upper 12 without use of conventional adhesive. Selection of material 42 used to form midsole 16 may be done to customize the stiffness of midsole 16 and or to tailor the bonding between midsole 16 and outer sole 14 to customize the flexibility or stiffness characteristics of shoe 10.

Figure 4:
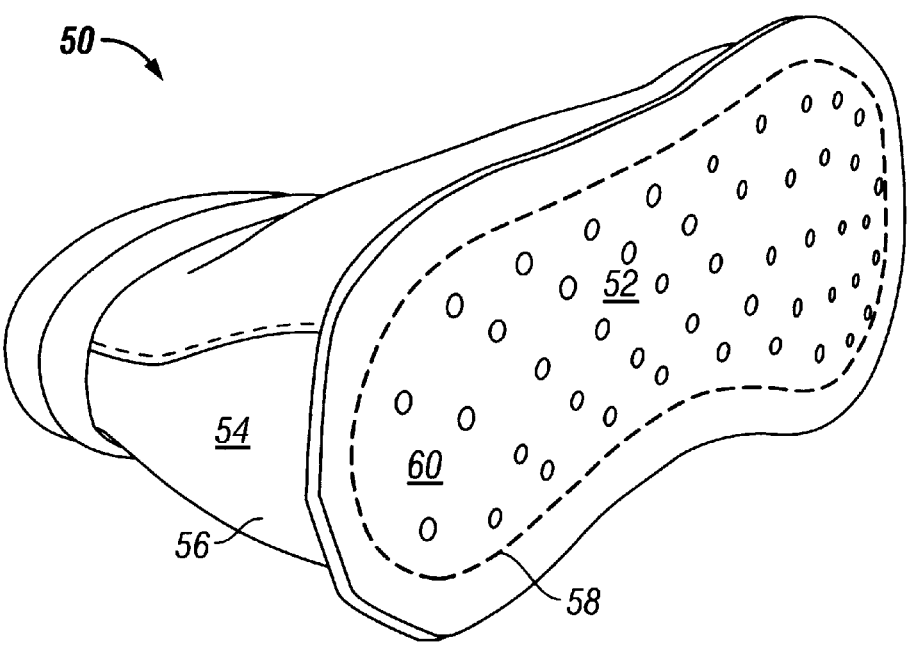
FIG. 4 is a picture of the heel of a welted midsole according to the present invention.

Referring now to FIG. 4, footwear such as shoe 50 is shown at an angle to permit viewing midsole 52 from heel 54. Upper 56 is attached to midsole 52 by welting or stitching 58 or any other suitable method. In a currently preferred embodiment of the present invention a shoe such as shoe 50 is formed on a last. In a first embodiment, midsole 52 is composed of a first material such as material 60.

Figure 5:
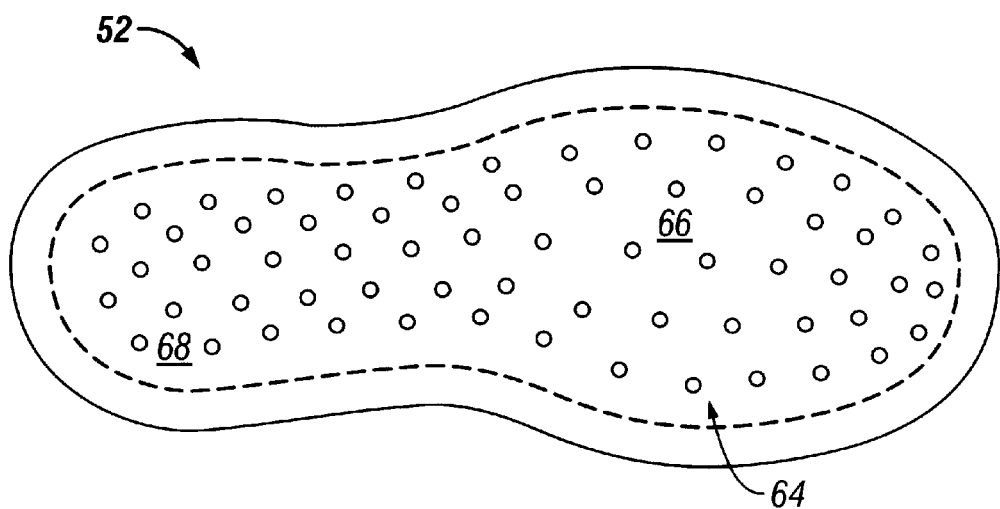
FIG. 5 is a picture of the bottom of a welted midsole using a first material according to the present invention.

Referring now to FIG. 5, shoe 62 is shown with a view perpendicular to lower surface 64 of midsole 66. Midsole 66 is composed of a second alternative material such as material 68.

Figure 6:
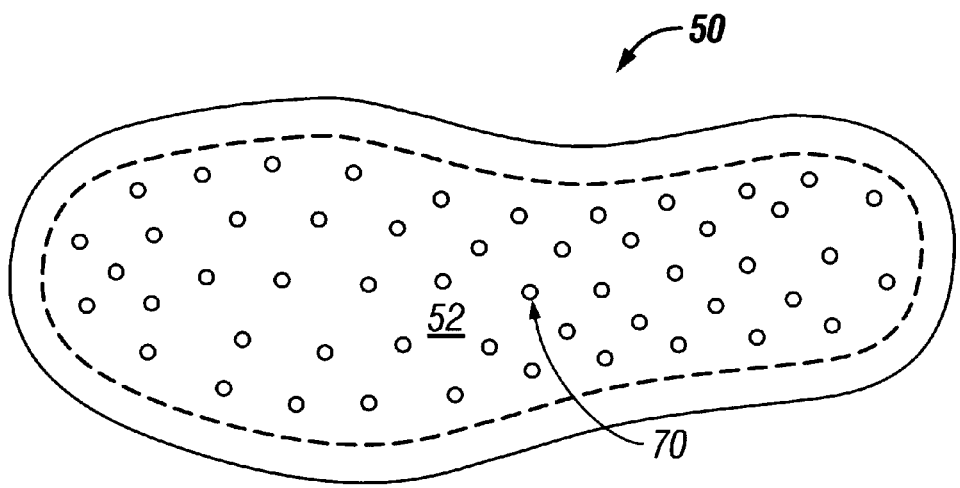
FIG. 6 is a picture of the bottom of a welted midsole using a second material according to the present invention.

Referring now to FIG. 6, shoe 50 is shown with a view perpendicular to lower surface 52L of midsole 52. A number of perforations such as perforation 70 permit the molten material which forms the outer sole to flow through midsole 52 and sandwich or completely envelope midsole 52 and form a tight midsole to outer sole bond.

Figure 7:
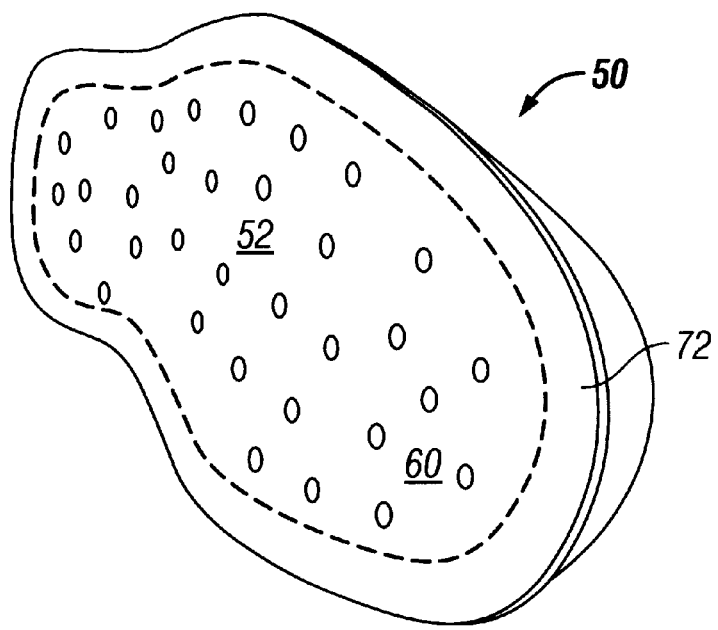
FIG. 7 is a picture of the toe of a welted midsole according to the present invention.

Referring now to FIG. 7, shoe 50 is shown at an angle to permit viewing midsole 52 from toe 72. In a first embodiment, midsole 52 is composed of a first material such as material 60.

Figure 8:
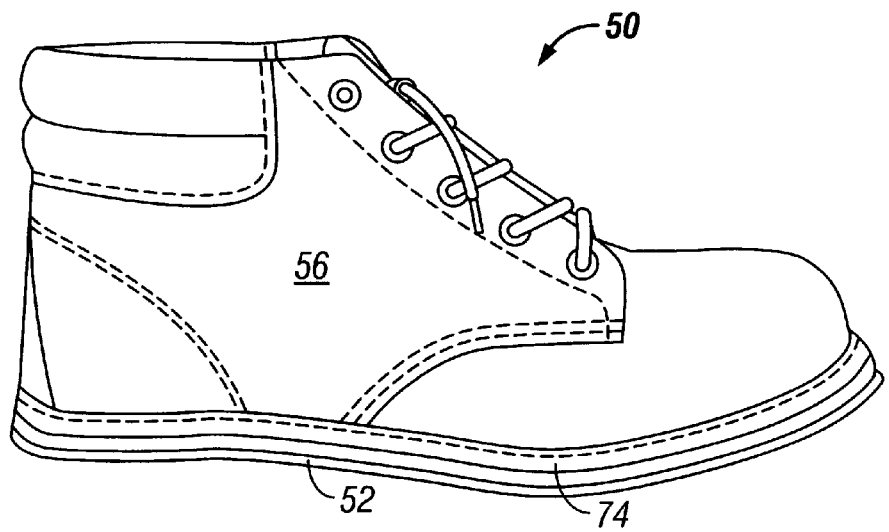
FIG. 8 is a side view picture of an upper having a welted midsole according to the present invention.

Referring now to FIG. 8, shoe 50 is shown in a side view with upper 56 attached to midsole 52 using welting strip 74. Welting strip 74 may be composed of any suitable material such as leather, rubber, or a synthetic material such as polyurethane. According to the present invention, upper 56 may be a mid size, as shown, or a low cut shoe style or a high cut boot style or any other style footwear.

Figure 9:
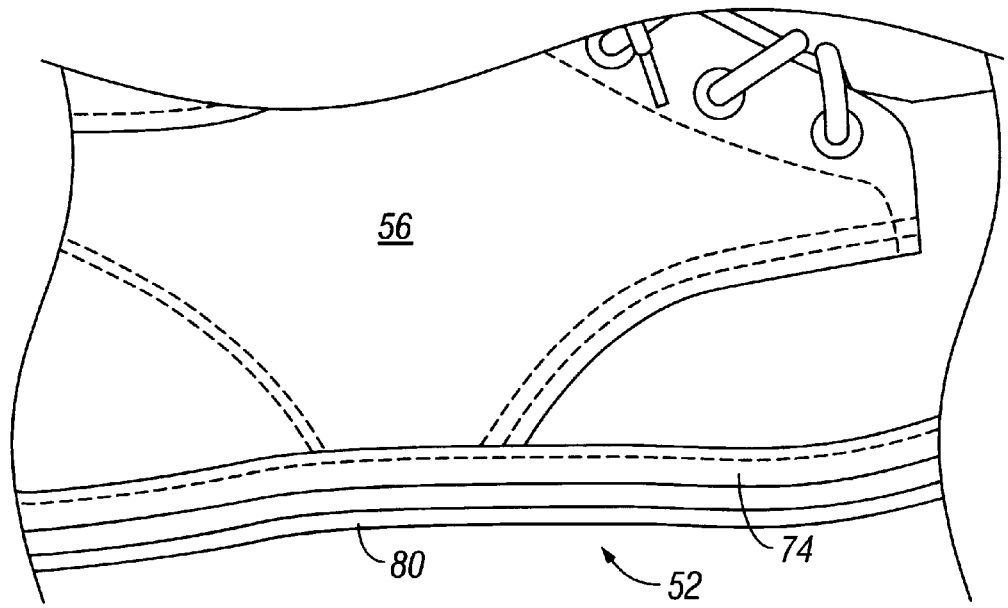
FIG. 9 is a close-up view of the shoe of FIG. 8.

Referring now to FIG. 9, shoe 50 is shown in a close-up side view with upper 56 attached to midsole 52 using welting strip 74. In this view an outer sole such as outer sole 40 of FIG. 3 has not yet been molded in place. Edge 80 of midsole 52 is clearly visible adjacent welting strip 74.

Figure 10:
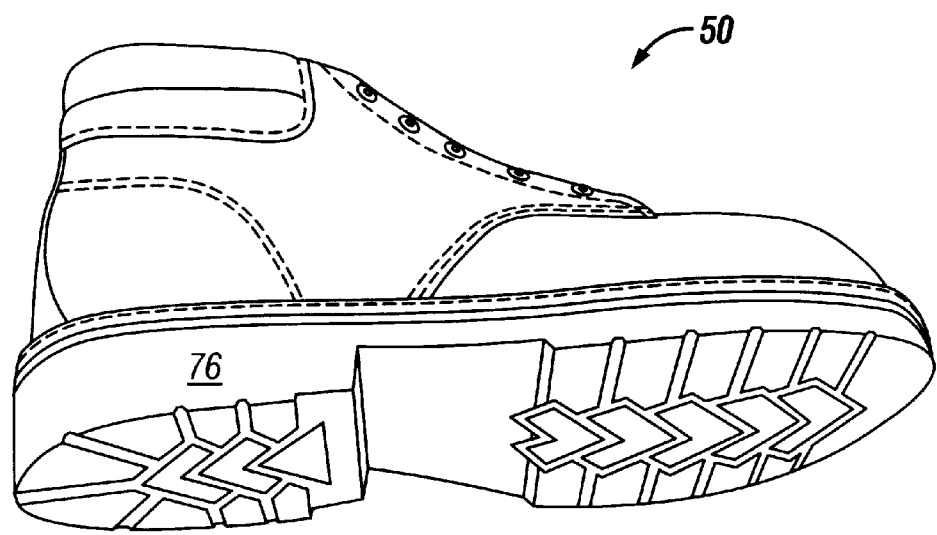
FIG. 10 is a low angle side view picture of a shoe having a molded outer sole according to the present invention.

Referring now to FIG. 10, shoe 50 is shown in a low angle side view showing outer sole 76 formed according to the present invention. After formation of outer sole 76, edges of midsole 52 such as edge 80 are difficult to distinguish.

Figure 11:
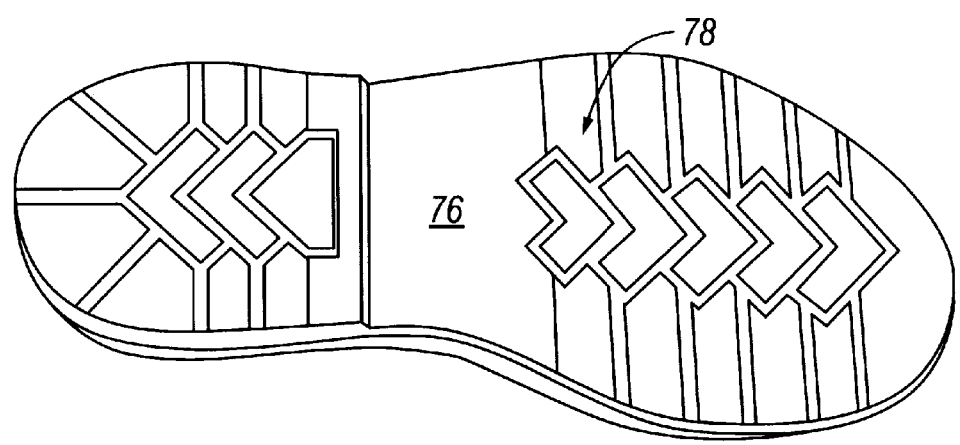
FIG. 11 is a picture of a molded outer sole according to the present invention.

Referring now to FIG. 11, shoe 50 is shown with a view perpendicular to lower surface 76L of outer sole 76. Outer sole 76 may contain any conventional patterns or treads such as tread 78.

Figure 12:
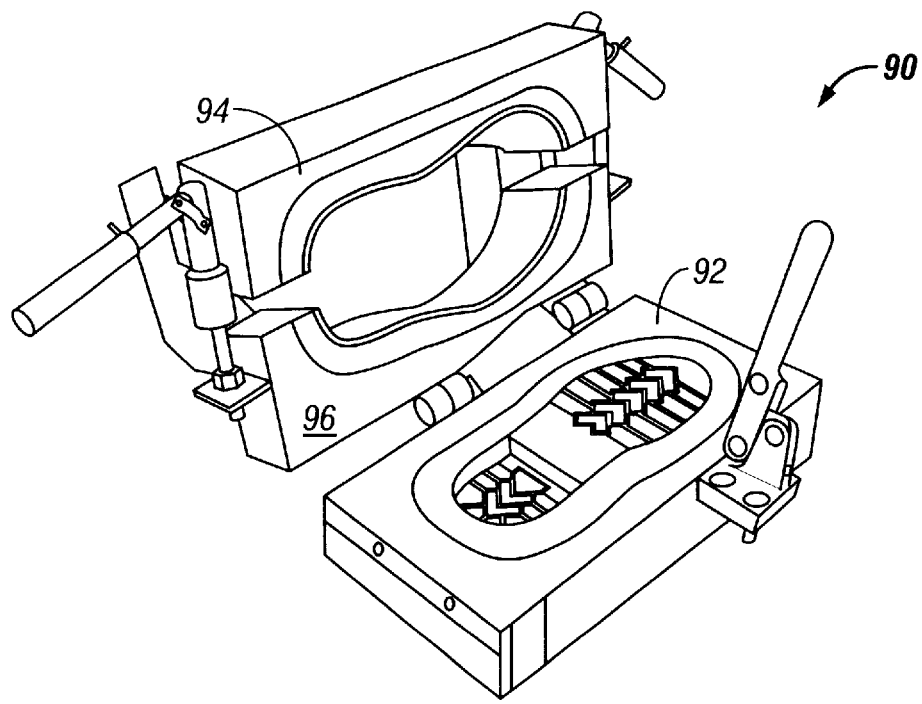
FIG. 12 is a picture of an open shoe mold according to the present invention.

Referring now to FIG. 12, a mold such as mold 90 is used to form outer soles such as outer sole 76 according to the present invention. Molds such as mold 90 may be composed of three elements, sole mold 92, upper mold half 94 and upper mold half 96. Mold 90 may be made of any suitable material such as steel or aluminum.

Figure 13:
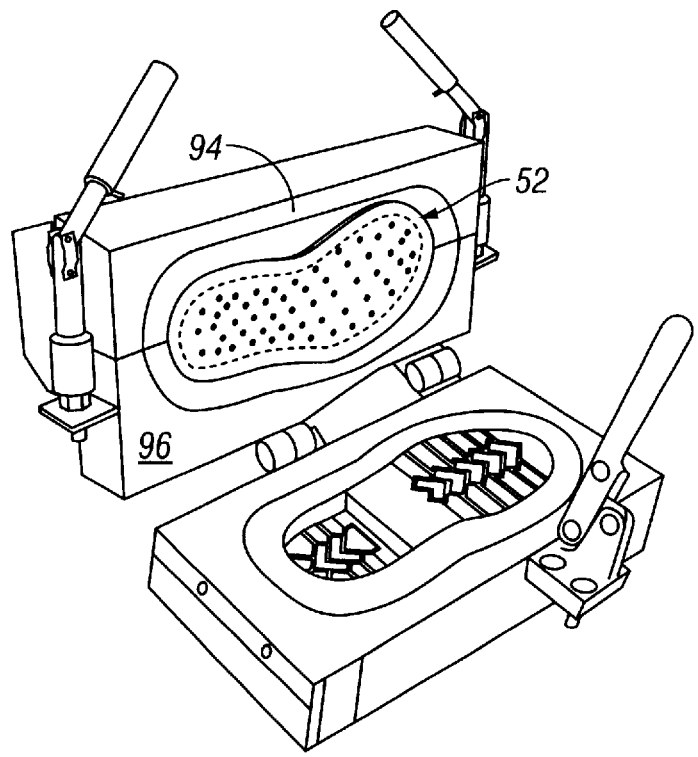
FIG. 13 is a picture of an open shoe mold including an upper having a welted midsole according to the present invention.

Referring now to FIG. 13, in a currently preferred embodiment of the present invention, an upper such as upper 56 having a welted midsole such as midsole 52 may be secured between upper mold half 94 and upper mold half 96. Upper mold half 94 and upper mold half 96 may be secured together in any conventional manner.

Figure 14:
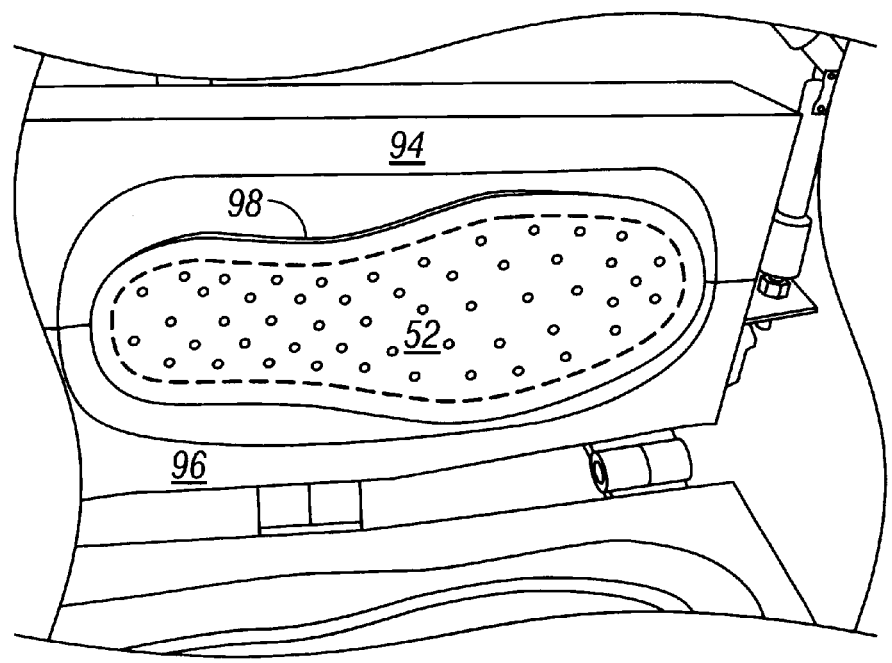
FIG. 14 is a close-up picture of a mold cover including an upper having a welted midsole.

Referring now to FIG. 14, is a close-up picture of a mold cover enclosing an upper having a welted midsole according to the present invention. In a currently preferred embodiment of the present invention material 98 is a welting strip such as welting strip 74 which is in direct contact with upper mold half 94 and upper mold half 96. Having material 98 contact upper mold half 94 and upper mold half 96 prevents the material used to form an outer sole from contacting or curing on a welting strip such as welting strip 74 or on an upper such as upper 56.

Figure 15:
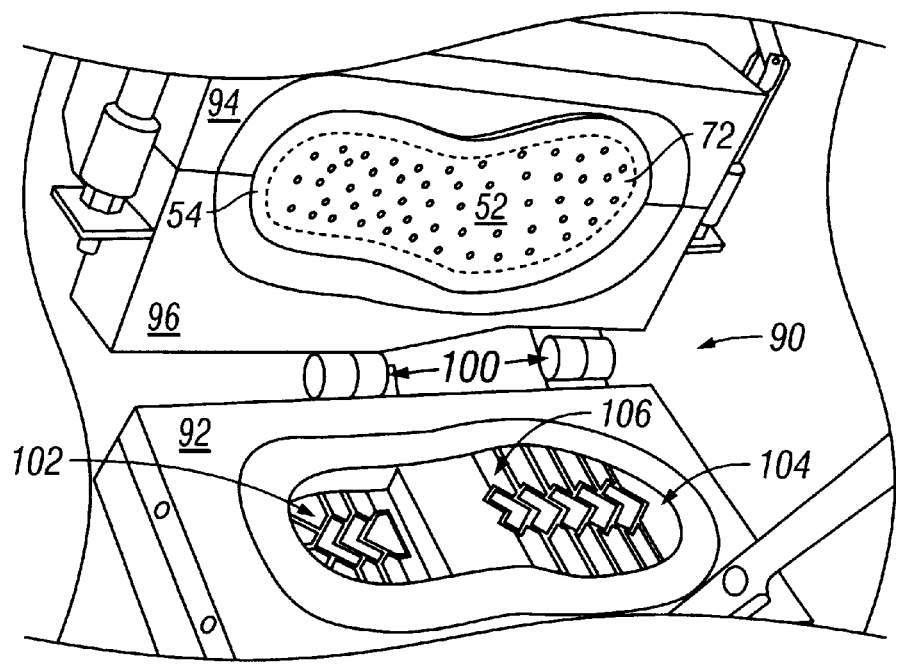
FIG. 15 is a close-up picture of an outer sole mold bottom.

Referring now to FIG. 15, in a close-up picture of open mold 90 the alignment between outer sole mold 92 and a welted midsole such as midsole 52 may be seen. In use, upper mold half 94 and upper mold half 96, enclosing a welted upper and midsole such as shoe 50 of FIG. 8, pivot on hinges such as hinges 100 thus bringing heel 54 in close proximity to outer sole heel area 102 and toe 72 in close proximity to outer sole toe area 104. Patterns or treads such as tread 78 of FIG. 11 may be formed by mold patterns such as pattern 106.

Figure 16:
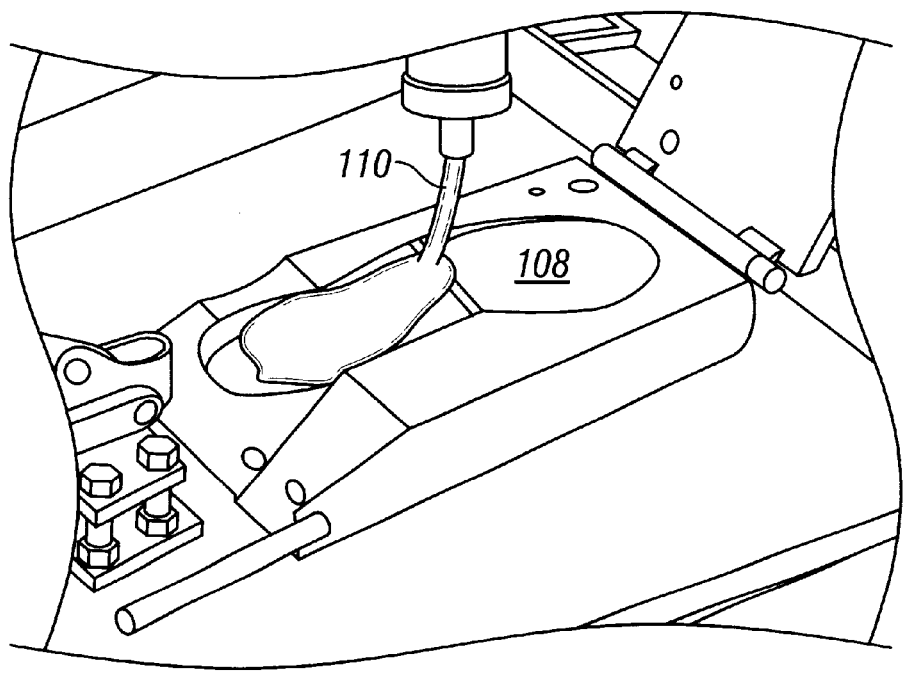
FIG. 16 is a picture of an outer sole mold bottom being filled with molten sole material.

Referring now to FIG. 16, outer sole mold bottom 108 may be filled with molten sole material 110. Molten sole material 110 may be any suitable natural or synthetic material. In a currently preferred embodiment of the present invention, molten sole material 110 is polyurethane.

Figure 17:
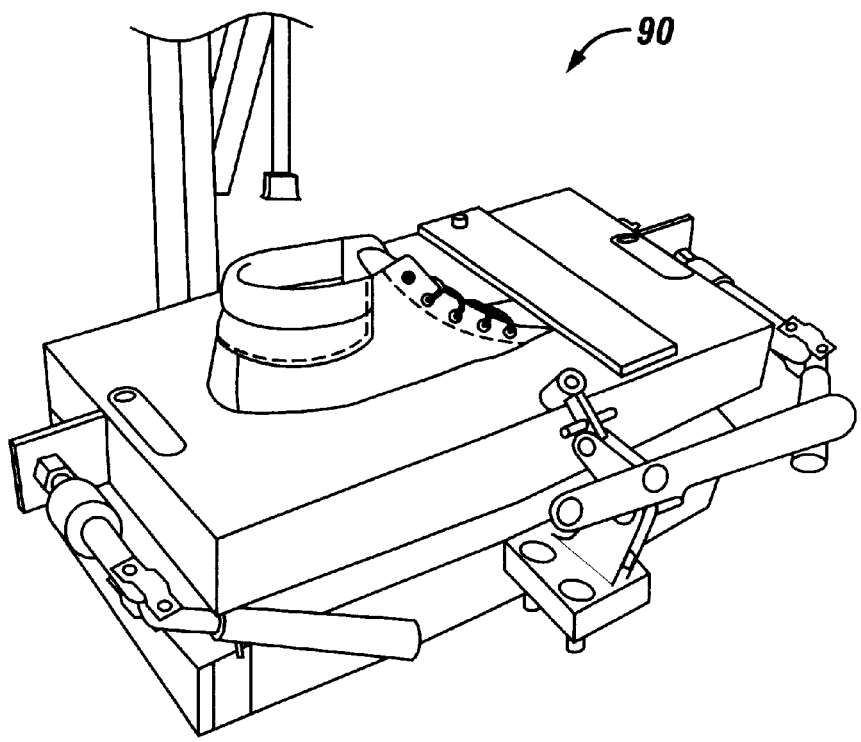
FIG. 17 is a picture of a closed shoe mold with an upper extending therefrom according to the present invention.

Referring now to FIG. 17, a shoe mold such as mold 90 may be closed thus forcing molten sole material 110 into contact with a midsole such as midsole 52. The volume of molten sole material 110 may be sufficient to force molten sole material 110 through perforations such as perforation 70 and cause space 36 to be filled with molten sole material 110.

Figure 18:
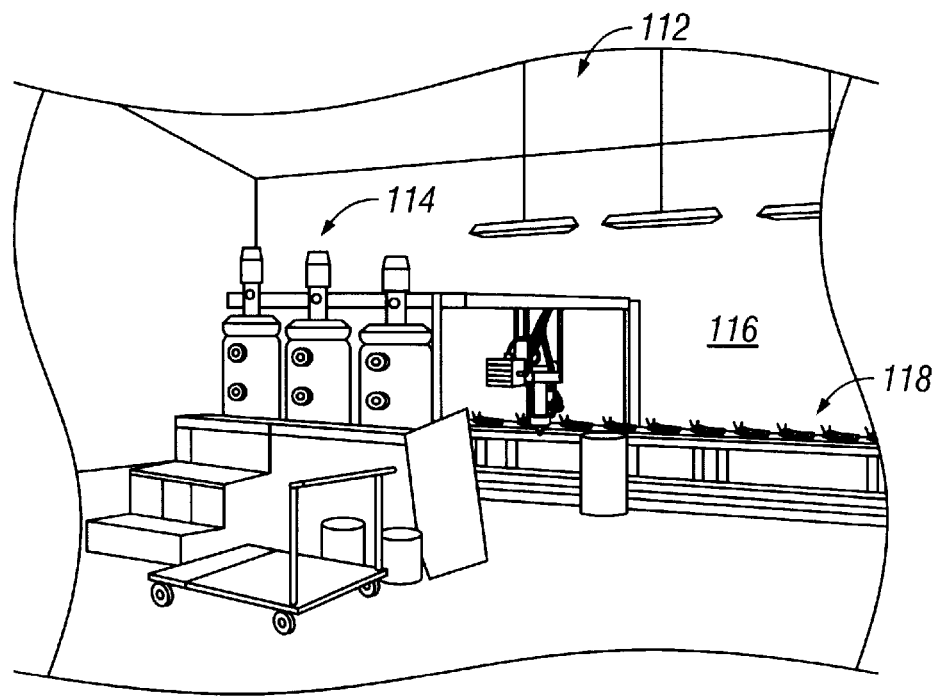
FIG. 18 is a picture of a mold filling apparatus according to the present invention.

Referring now to FIG. 18, in a currently preferred embodiment of the present invention a production facility such as production facility 112 may be used to manufacture footwear according to the present invention. Production facility 112 may include one or more sole material dispenser devices such as device 114, one or more curing devices such as curing device 116 and one or more conveyor devices such as conveyor 118.

Figure 19:
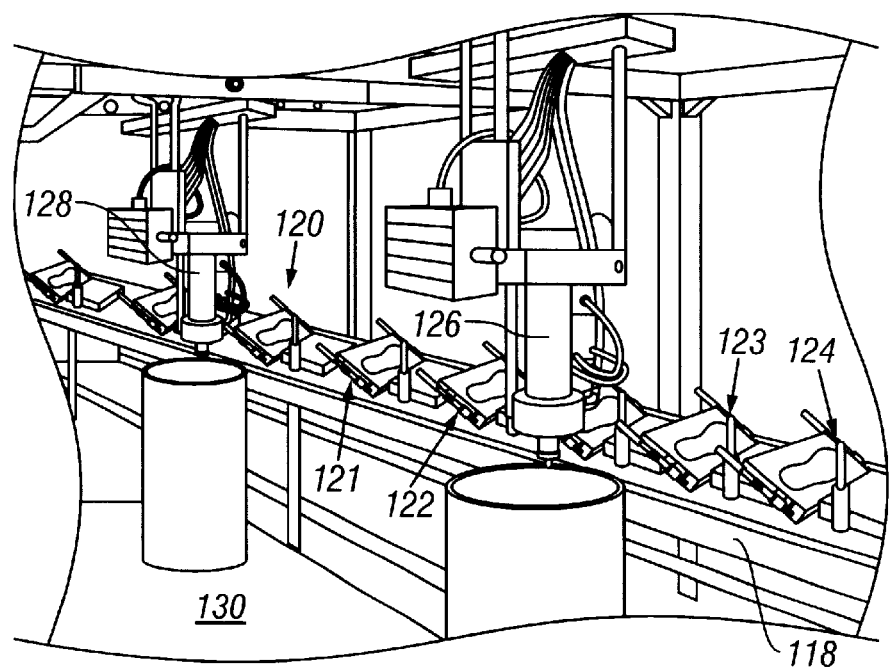
FIG. 19 is a picture of a mold conveyor according to the present invention.

Referring now to FIG. 19, a mold conveyor such as conveyor 118 may be used to move molds such as molds 120–124. Sole material dispenser heads 126 and 128 may be used to dispense molten sole material such as molten sole material 110 into molds such as molds 120–124 as the molds pass by position 130 on conveyor 118.

Figure 20:
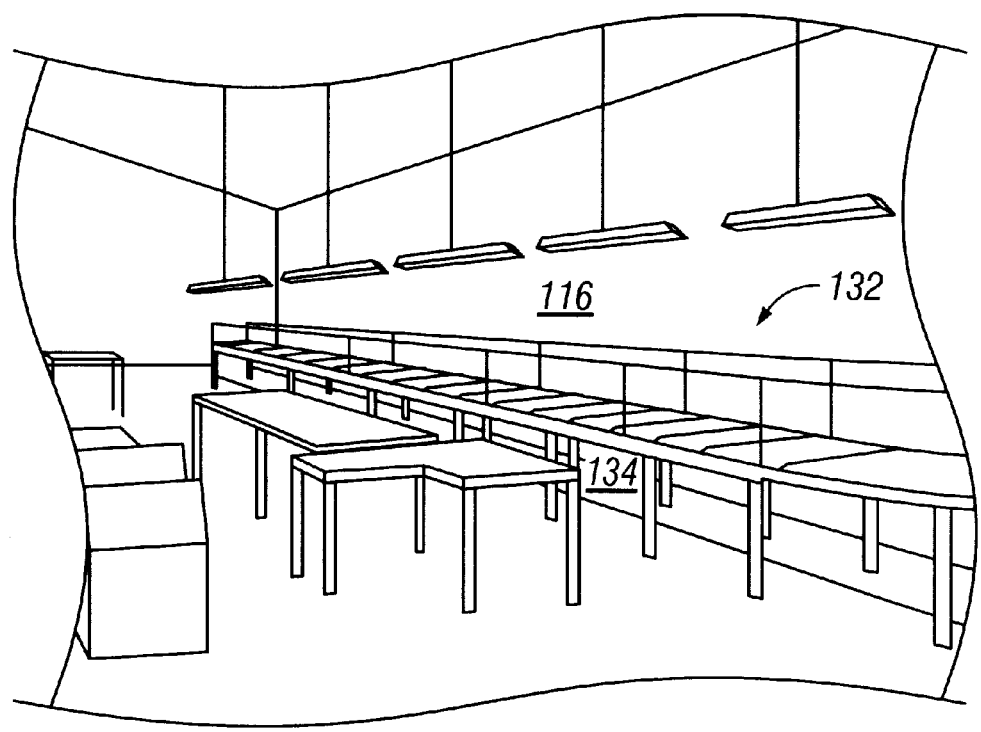
FIG. 20 is a picture of a manufacturing facility according to the present invention.

Referring now to FIG. 20, after molds are filled and closed, they may be transported to a curing device such as curing device 116. After molds exit curing device 116 through exit 132 the molds may be opened and finished footwear may be removed at position 134.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. An injection molded and wetted footwear comprising:
   a. an upper;
   b. a mid sole having a plurality of perforations, being attached to the upper using one or more welting strips; and
   c. a molten outer sole being bound to the upper through the perforations on the mid sole;
   d. said molten outer sole not being in direct contact with the welting strips.
2. The footwear of claim 1 wherein said upper is formed from leather, fabric, or synthetic material.
3. The footwear of claim 1 wherein said molten outer is formed using molten polyurethane.
4. The footwear of claim 1 wherein said perforated mid sole is made of soft to semi-rigid mid sole board material.
5. The footwear of claim 1 wherein said perforations are formed in shapes of squares, rectangles, chevrons, or arcs.
6. The footwear of claim 1 wherein said perforations are circular and are formed by die cutting.
7. The footwear of claim 1 wherein said welting strips are composed of leather, rubber, or polyurethane.
8. The footwear of claim 1 wherein said mid sole is attached to said upper using a stitching through said welting strips.
9. The footwear of claim 1 further comprising:
   a. an insole,
   b. a fill space between the mid sole and the insole, and
   c. a material,
   wherein said material is permitted to flow through the perforations on said mid sole and fill the fill space, whereupon curing or hardening of said material the mid sole is inextricably bound within said material of the outer sole such that said outer sole is attached to the upper without using a conventional adhesive.
10. The footwear of claim 9, wherein a last is used in said upper to maintain an even distribution of said material.

* * * * *